Figure 1:
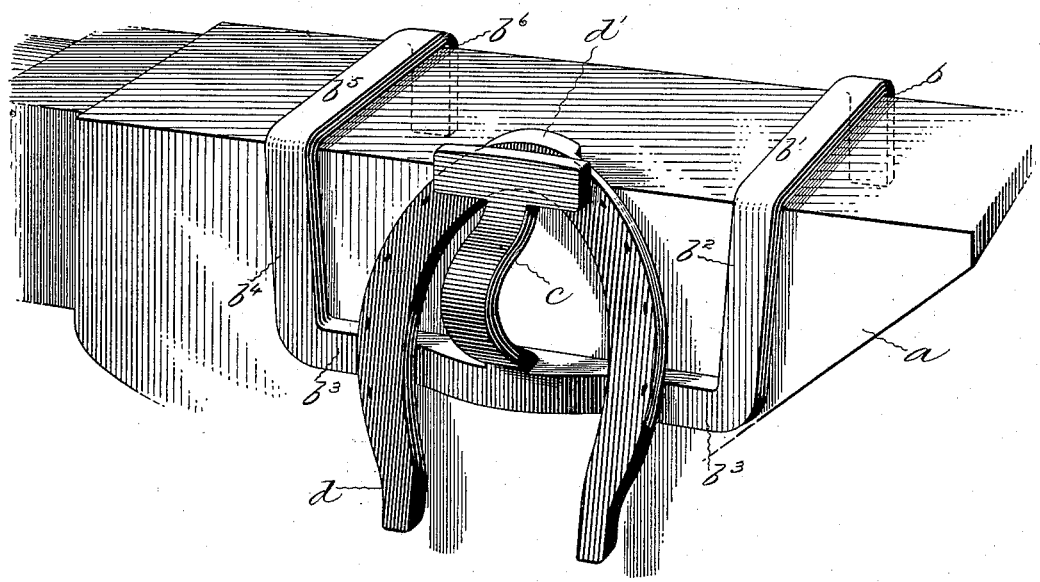

No. 609,014. Patented Aug. 16, 1898.
W. DUFFY.
ANVIL ATTACHMENT FOR REPAIRING HORSESHOE CALKS.
(Application filed Jan. 28, 1898.)

(No Model.)

Witnesses
Caspar J Simonds
C. E. Buckland

Inventor
William Duffy
By W. E. Simonds
Attorney

THE NORRIS PETERS CO., PHOTO-LITHO., WASHINGTON, D. C.

UNITED STATES PATENT OFFICE.

WILLIAM DUFFY, OF EAST HARTFORD, CONNECTICUT.

ANVIL ATTACHMENT FOR REPAIRING HORSESHOE-CALKS.

SPECIFICATION forming part of Letters Patent No. 609,014, dated August 16, 1898.

Application filed January 28, 1898. Serial No. 668,252. (No model.)

*To all whom it may concern:*

Be it known that I, WILLIAM DUFFY, a citizen of the United States of America, residing at East Hartford, in the county of Hartford and State of Connecticut, have invented a certain new and useful Improvement in Anvil Attachments for Repairing Horseshoe-Calks, of which the following is a description, reference being had to the accompanying drawing, wherein the figure is a view of an anvil bearing said improvement with a horseshoe in place for the repair of the toe-calk.

The object of the improvement is the production of a device designed for temporary attachment to a blacksmith's anvil, and especially applicable to the purpose of holding a horseshoe in such contact with the anvil as to facilitate the repair of the toe-calk.

The device consists in a general sense of a frame adapted to temporarily hook upon the anvil and carrying midway of the frame an upright adapted to hold the shoe against the anvil, while the toe-calk rests upon the surface of the anvil in good position for repair.

In the accompanying drawing, the letter $a$ denotes the anvil. The frame embodies the parts $b$ $b'$ $b^2$ $b^3$ $b^4$ $b^5$ $b^6$. The parts $b$ and $b^6$ are what may be termed the "hooks" of the frame. This frame carries midway of its width the upright $c$, which is adapted to hold the horseshoe $d$ against the side of the anvil, leaving the toe-calk $d'$ resting upon the top surface of the anvil in good position for repair.

This device is intended to be hooked upon and attached to the anvil only when and while the blacksmith is engaged in the repair of a horseshoe-calk. At other times it rests in any convenient place. When needed for use, it is hooked upon the anvil, as shown.

I claim as my improvement—

The frame composed of the parts $b$, $b'$, $b^2$, $b^3$, $b^4$, $b^5$, $b^6$, adapted to temporarily hook upon the anvil and carrying midway of its size the upright adapted to hold the horseshoe against the anvil, all substantially as described and for the purposes set forth.

WILLIAM DUFFY.

Witnesses:
W. E. SIMONDS,
FLORENCE M. BRAGG.